US006978458B1

(12) United States Patent
Ghosh et al.

(10) Patent No.: US 6,978,458 B1
(45) Date of Patent: Dec. 20, 2005

(54) DISTRIBUTING DATA ITEMS TO CORRESPONDING BUCKETS FOR USE IN PARALLEL OPERATIONS

(75) Inventors: Bhaskar Ghosh, Burlingame, CA (US); Benoit Dageville, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 640 days.

(21) Appl. No.: 09/715,552

(22) Filed: Nov. 17, 2000

(51) Int. Cl.[7] ................................. G06F 9/46
(52) U.S. Cl. .......................... 718/100; 707/7
(58) Field of Search ............... 709/100; 707/7, 707/1, 10; 718/1, 100–108; 719/321, 328

(56) References Cited

U.S. PATENT DOCUMENTS

| | | | | |
|---|---|---|---|---|
| 5,440,736 A | * | 8/1995 | Lawson, Jr. ................... | 707/7 |
| 5,729,732 A | * | 3/1998 | Gal et al. ...................... | 707/7 |
| 5,748,844 A | * | 5/1998 | Marks .......................... | 706/45 |
| 5,854,938 A | * | 12/1998 | Ogi ............................. | 712/30 |
| 6,182,070 B1 | * | 1/2001 | Megiddo et al. ............... | 707/6 |
| 6,427,148 B1 | * | 7/2002 | Cossock ....................... | 707/7 |
| 6,604,096 B1 | * | 8/2003 | Couch et al. .................. | 707/2 |

OTHER PUBLICATIONS

Viswanath Poosala et al., "Improved Histograms for Selectivity Estimation of Range Predicates," Jun. 1996, ACM, pp. 294-305.*

* cited by examiner

Primary Examiner—Meng-Al T. An
Assistant Examiner—Li Zhen
(74) Attorney, Agent, or Firm—Hickman Palermo Truong & Becker LLP; Brian D. Hickman; John D. Henkhaus (57) ABSTRACT

Techniques are provided for evenly distributing data items of a particular set of data to a plurality of buckets. The buckets of data items may then be assigned to processes to perform operations on the data items in parallel with the other processes. In one embodiment, the set of data (which may come from tables or be the result set of a previous operation) is divided into a plurality of subsets. For each subset of the plurality of subsets, a sample of data items is randomly selected. The sampling itself may be performed in parallel, with each sampling process using a different seed to randomize its selection of samples. The sampled data items are sorted and ranges are determined based on distribution keys of the sampled data items. The ranges are assigned to buckets, and the data items are then distributed to the buckets assigned to the range into which their distribution key falls.

26 Claims, 4 Drawing Sheets

DISTRIBUTING DATA ITEMS TO CORRESPONDING BUCKETS FOR USE IN PARALLEL OPERATIONS

FIELD OF THE INVENTION

The present invention relates generally to parallel operations and, more specifically, to evenly distributing data items to corresponding buckets for processing during such operations.

BACKGROUND OF THE INVENTION

One way to decrease the time it takes for a computer system to perform a task involves splitting the task up into subtasks and executing the subtasks in parallel using a set of concurrently executing processes. One example of a task that is often performed in parallel within a database system is a sort operation. During sort operations, the data items that belong to a set of data are arranged in sorted order. Within a relational database system, the data items are typically rows, and the set of data in which they reside is a table.

To be processed in parallel, the data items are distributed among a set of processes that will process the data items. Depending on the operation involved, the distribution may be random, based on values associated with the data items. For example, in a sort operation, the distribution will generally be based on the sort key, where data items with a sort key in a particular sub-range will be sent to a corresponding "bucket." In this context, a bucket is a destination in a data distribution operation. Thus, the act of distributing the data items to the parallel processes involves establishing a set of buckets and assigning the data items to the buckets.

For parallel operations to work efficiently, the number of data items assigned to each of the buckets should be substantially the same (or "even") so that each process can start and end the operation at about the same time. Otherwise, one process, after finishing its operation, may become idle waiting for other processes to finish their corresponding operations. In situations in which the workload is not evenly distributed, the benefits of parallelism are diminished.

During parallel operations, data items are typically assigned to buckets based on values contained in the data items. The values used to assign data items to buckets are referred to herein as distribution keys. For parallel sort operations, the distribution keys are typically the values by which the data items are to be sorted. To distribute the data items based on the distribution keys, each bucket is typically assigned a value range, and all data items that have distribution keys that fall within that value range are assigned to that bucket. In particular, the buckets have an order, and the ranges are assigned to the buckets in a monotonically increasing, left-to-right fashion. The way to ensure that work is evenly distributed among the parallel processes involves assigning to the buckets value ranges that cover approximately the same number of data items.

To attempt to evenly distribute data items during a parallel sort operation performed on a set of data, a database server could be configured to read the first N data items in the set of data (or in each partition of a partitioned set of data) that is being fed into the sort. The sort key distribution reflected by the data items collected in this manner can be assumed to reflect the distribution of sort values within the entire set of data. Based on this assumption, ranges may be assigned to the buckets in a manner that would evenly distribute the entire set of data items among the buckets if the sort value distribution reflected by the collected data items accurately reflects the distribution of sort values within the entire set of data.

Unfortunately, the sort value distribution reflected by the first N data items in a set of data does not always accurately reflect the distribution of sort values within the entire set of data. This is especially true, for example, when the data items have been loaded into the set of data in a batch fashion, in which the set of data may contain locally sorted clusters of data items.

Another problem with reading the first N data items of each partition is that N may be too large to be efficient for sorting small sets of data, and too small to be efficient for sorting large sets of data. Specifically, if N is 100 and there are only 200 data items in each partition, then the amount of work performed to determine the ranges to assign to the buckets will be far greater than is justified for the relatively small amount of work of involved in sorting the data. On the other hand, if there are several million data items in the set of data, it may be desirable to perform more work up front to increase the likelihood that the data items will be evenly distributed to the buckets.

Selecting bad data samples causes negative consequences in various circumstances. For example, assume that the sort operation is being performed to find the data of the ten most senior persons in a particular set of data that includes fifty persons of ages from 0 to 99. For illustration purposes, it shall be assumed that four sort processes are to be used to perform the sort operation, and that the ranges assigned to their buckets are 0–24, 25–49, 50–74 and 75-99. In this example, if the data is evenly distributed in each of the buckets, then the data for the ten most senior persons must be in the fourth bucket (the bucket of data of persons having ages from 75–99). Consequently, the sort process for the fourth bucket simply provides the ten desired data items of persons who are the most senior in this fourth bucket, and thus in all buckets.

However, if the data is not evenly distributed in each of the buckets, such as, for example, there is only data for eight persons in bucket four, then bucket three must be sorted and processed to provide data for the next two most senior persons. The eight persons in bucket four and the two most senior persons in bucket three constitute the ten most senior persons in the entire set. If bucket four and bucket three do not provide all of the desired data, then bucket two must be sorted and accessed to provide the missing desired data. Similarly, if bucket four, bucket three, and bucket two do not provide all of the desired data, then bucket one must be sorted and accessed.

Based on the forgoing, it is clearly desirable to provide a better mechanism to evenly distribute data items of a particular set of data to corresponding buckets for use in parallel operations, such as parallel sorts.

SUMMARY OF THE INVENTION

Techniques are provided for distributing data items of a particular set of data to a plurality of buckets. The data items in these buckets may then be processed in parallel by processes to which the buckets are assigned. In one embodiment, the set of data is divided into a plurality of subsets. For each subset of the plurality of subsets, a sample of data items is randomly selected. Based on the sampled data items from all of the subsets of the set of data, ranges to distribute the data items are determined. Typically, one range corresponds to one bucket. The data items are then distributed to the buckets, based on these ranges. Because the data items that are used to establish the ranges are randomly selected, they have a higher likelihood of reflecting the actual value distribution of the entire set of data. Consequently, there is a higher likelihood that the ranges established based on the sampling will result in an even distribution of data items than ranges established based, for example, on the first N data items in a partition.

According to one aspect of the invention, the random seeds used by the random generators to randomly select the sampled data are distinct for each of the subsets of the set of data.

According to another aspect of the invention, the sampled data to be selected is tunable by a user who submits operations to be performed on the data.

In one embodiment, when the input to the sort is a base table or a partition, the number of rows of data that are randomly selected is determined by specifying a percentage of a total number of rows in the table or partition. In an alternative embodiment, the sampled rows of data are randomly selected by specifying a percentage of a total number of partitions in the table.

The techniques described herein may be applied in situations in which the set of data to be sorted is the set of data that results from performance of one or more previous operations. For example, a series of operations may be performed on data from a table, where one operation in the series is a sort operation. Under these circumstances, the data upon which the sort operation is performed is the set of data (the "intermediate data") produced by the operation immediately preceding the sort operation in the series of operations. Prior to performing the sampling on intermediate data, the intermediate data is "materialized". In one embodiment, the number of rows of data that are randomly selected may be determined as a percentage of the materialized intermediate data.

The optimal amount of sampling will vary from situation to situation. In particular, the increased efficiency resulting from better load balancing has to be balanced against the cost of performing the sampling. When the sampling is performed on intermediate data, the sampling overhead includes the time required to materialize the intermediate data. The overhead associated with performing a large sampling may, in some situations, outweigh the increased efficiency resulting from a better load balancing. In other situations, the increased efficiency may more than compensate for the sampling overhead.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for more evenly distributing data items of a particular set of data to a plurality of buckets for use in parallel operations. Because the data is distributed substantially evenly among the plurality of buckets, parallel operations performed on the data stored in the buckets are more efficient.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Parallel-Operation Systems

Figure 2:
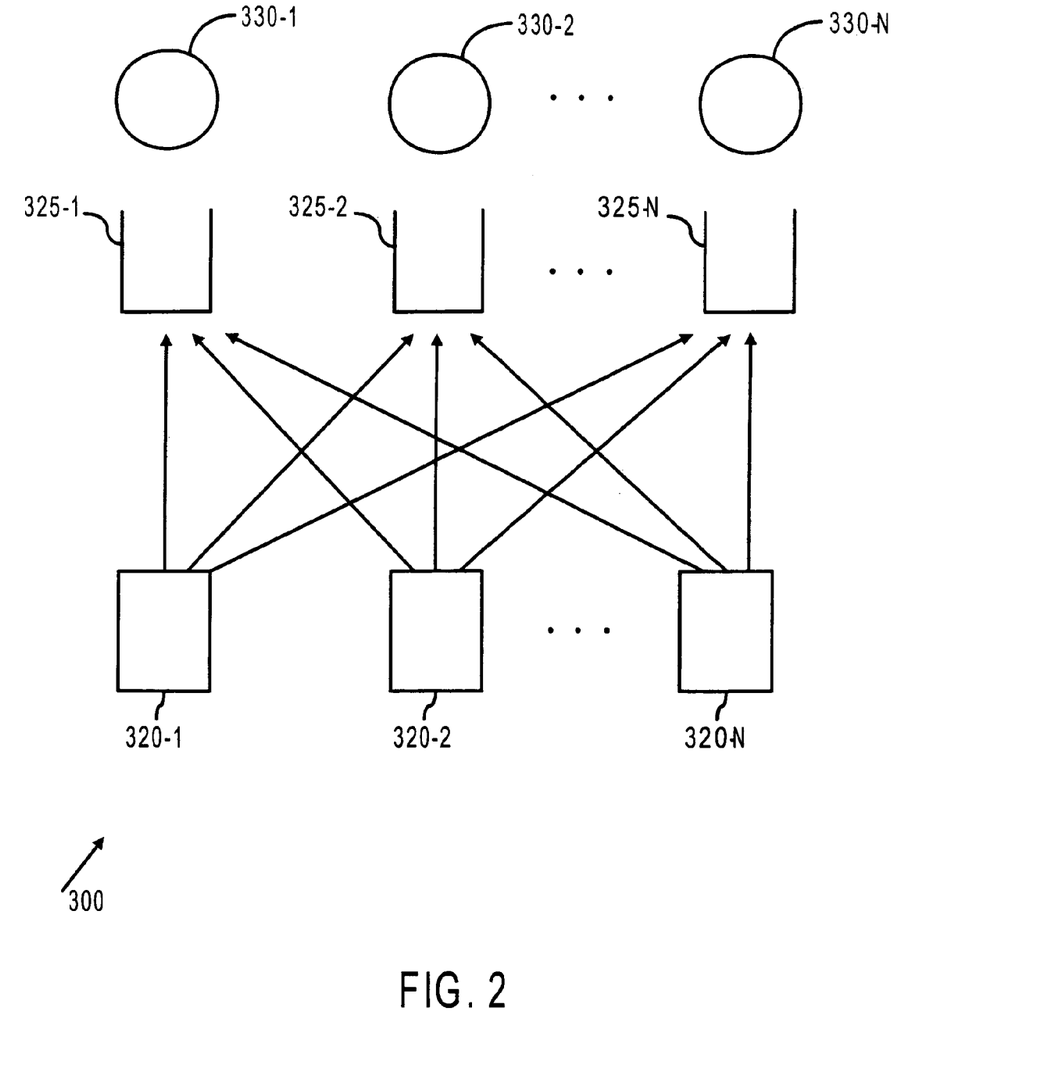
FIG. 2 shows an exemplary parallel operation system.

FIG. 2 shows a system 300 that performs parallel operations in accordance with one embodiment of the invention. System 300 includes a plurality of data partitions 320-1 to 320-N, a plurality of buckets 325-1 to 325-N, and a plurality of processes 330-1 to 330-N.

Each of the partitions 320-1 to 320-N stores a subset of the data to be processed by processes 330. In the embodiment illustrated in FIG. 2, there are the same number of partitions 320 as there are processes 330 that are to participate in the parallel operation. However, the invention is not limited to how the data is stored in each partition 320 nor how or whether the number of partitions 320 corresponds to the number of processes 330. Further, as mentioned above, the techniques described herein may be applied to intermediate results of operations, as well as to data extracted directly from partitions or tables. In this example, the set of data to be processed in the parallel operation includes all data in all partitions 320.

Before the set of data is processed by processes 330, data items in each of the partitions 320 are distributed to buckets 325. In one embodiment, buckets 325-1 to 325-N correspond to processes 330-1 to 330-N, respectively. Each process 330-1 to 330-N is used to perform operations on data stored in its corresponding bucket 325-1 to 325-N.

Techniques shall be described hereafter of how to make substantially equal the number of data items in each bucket 325 so that parallel operations performed on the data are more efficient.

Distributing Data Items to Corresponding Buckets

In one embodiment, data items in each subset of data in partitions 320 are randomly selected. The data items selected in this manner are referred to herein as the "sampled data items". Based on the sampled data items, ranges of the distribution keys are determined, and one range is assigned to each bucket 325. The data items that contain distribution keys that are within each range are then distributed to the bucket 325 that corresponds to that range. For example, in one embodiment, the goal is to distribute evenly to four buckets data items in a particular set of data. Assume that the particular set of data includes data for persons having ages from 0 to 99; and that the set of data has been partitioned into four subsets of data. In accordance with one embodiment, for each subset of the set of data, a sample of, for example, 50 data items are randomly selected.

Because 50 data items are selected in each of the four subsets, 200 (50 times 4) sampled data items are selected in all. The 200 sampled data items are then sorted based on their distribution keys. The ranges to use to distribute the data to the four buckets are determined in a manner that would equally distribute the sampled data items into the buckets. Since there are four buckets, it is preferable that each bucket contains 25% (100/4) of the data. For example, assume that it is determined that 25 percent of the sampled data items include ages from 0–14; 25 percent of the sampled data items include ages from 15–40; 25 percent of the sampled data items include ages from 41–70; and 25 percent of the sampled data items include ages from 71–99.

Consequently, in accordance with one embodiment, the four buckets are assigned the ranges 0–14, 15–40, 41–70, and 71–99, and the data items are distributed to the buckets accordingly. For example, data for persons having ages from 0–14 is distributed to a first bucket; data for persons having ages from 15–40 is distributed to a second bucket; data for persons having ages from 41–70 is distributed to a third bucket; and data for persons having ages from 71–99 is distributed to a fourth bucket.

In one embodiment, the sampling operation itself is performed in parallel. In such an embodiment, each of a plurality of sampling processes randomly selects data items in each of the subsets of the set of data using a random number generator to indicate which data items are to be selected. Often, random number generators require a "seed" from which they derive the first "random" number. According to one embodiment, in order to obtain good samples among the data items, the seeds are selected such that each seed used by one parallel sampling process to select sample data items for one subset of data is different from other seeds used by the other parallel sampling processes to select sample data items from the other subsets of data.

Embodiments of the Inventive Techniques

In accordance with the inventive techniques described above, the particular set of data to be distributed to buckets 325 can be obtained from different types of sources. In one embodiment, the set of data initially resides in durable storage, which is any means for durably storing the data, such as hard disks, CD ROMs, tapes, etc. In an alternative embodiment, the set of data is the results of a previously performed operation, or a series of previously performed operations, and is temporarily buffered in dynamic memory.

Figure 3A:
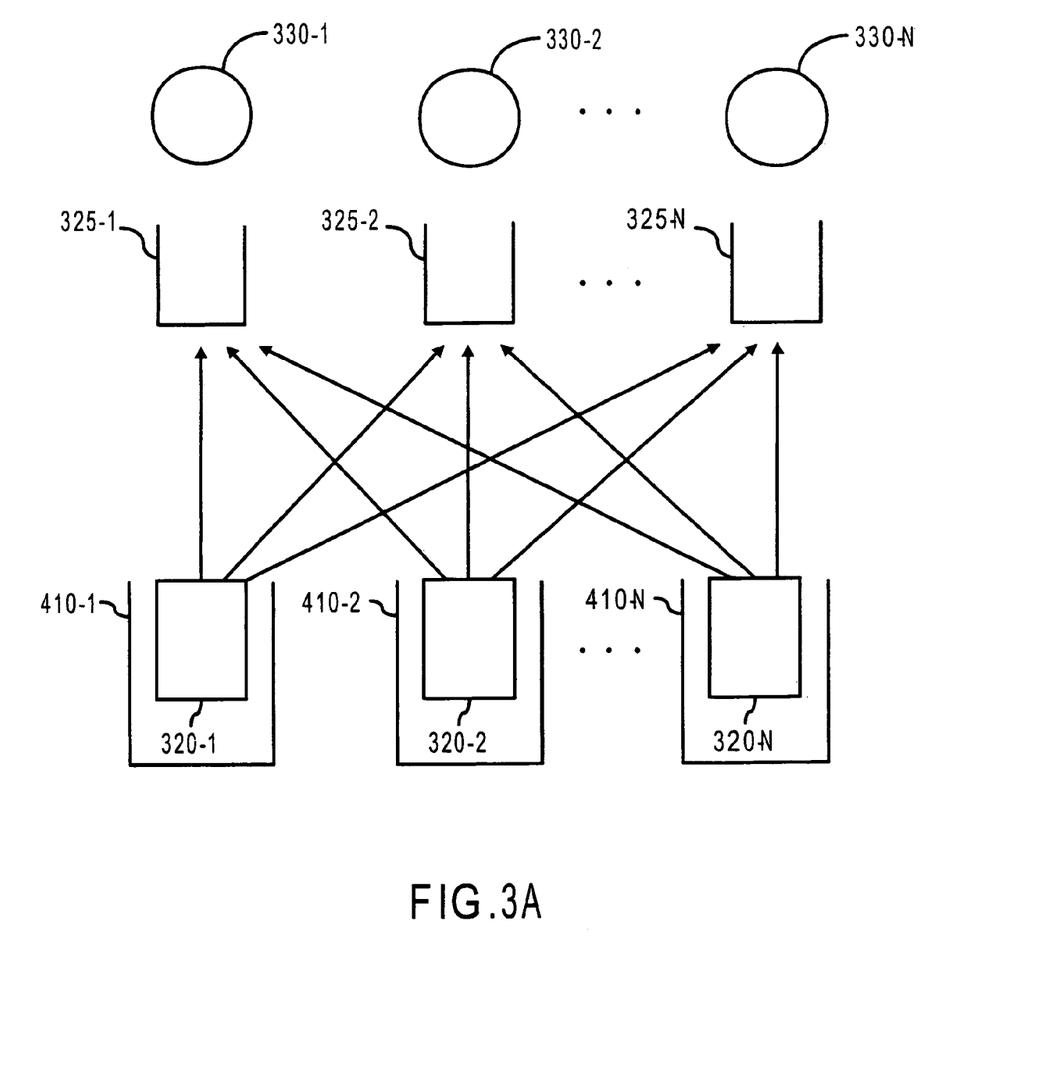
FIG. 3A shows an embodiment in which the data to be distributed to corresponding buckets is stored in durable storage.

FIG. 3A shows one embodiment in which data to be distributed to buckets 325 is stored in durable storage. In the embodiment shown in FIG. 3A, each of the partitions 320-1 to 320-N that stores a subset of data is stored on a corresponding hard disk 410-1 to 410-N. It is noted here that FIG. 3A is used for illustrative purposes only; the invention is not limited to how the partitions are stored in hard disks 410. One partition or a plurality of partitions 320 may be stored in one hard disk 410, or all partitions 320 may be stored in one hard disk 420. Operations performed on the data in each of the disks 410 are the same as described above. For example, data samples from the partitions on each disk 410 are randomly selected and, based on the sample data items, ranges are determined for the buckets. Data items from the disks 410 are then distributed to buckets 325, based on the range into which the distribution keys of the data items fall.

Figure 3B:
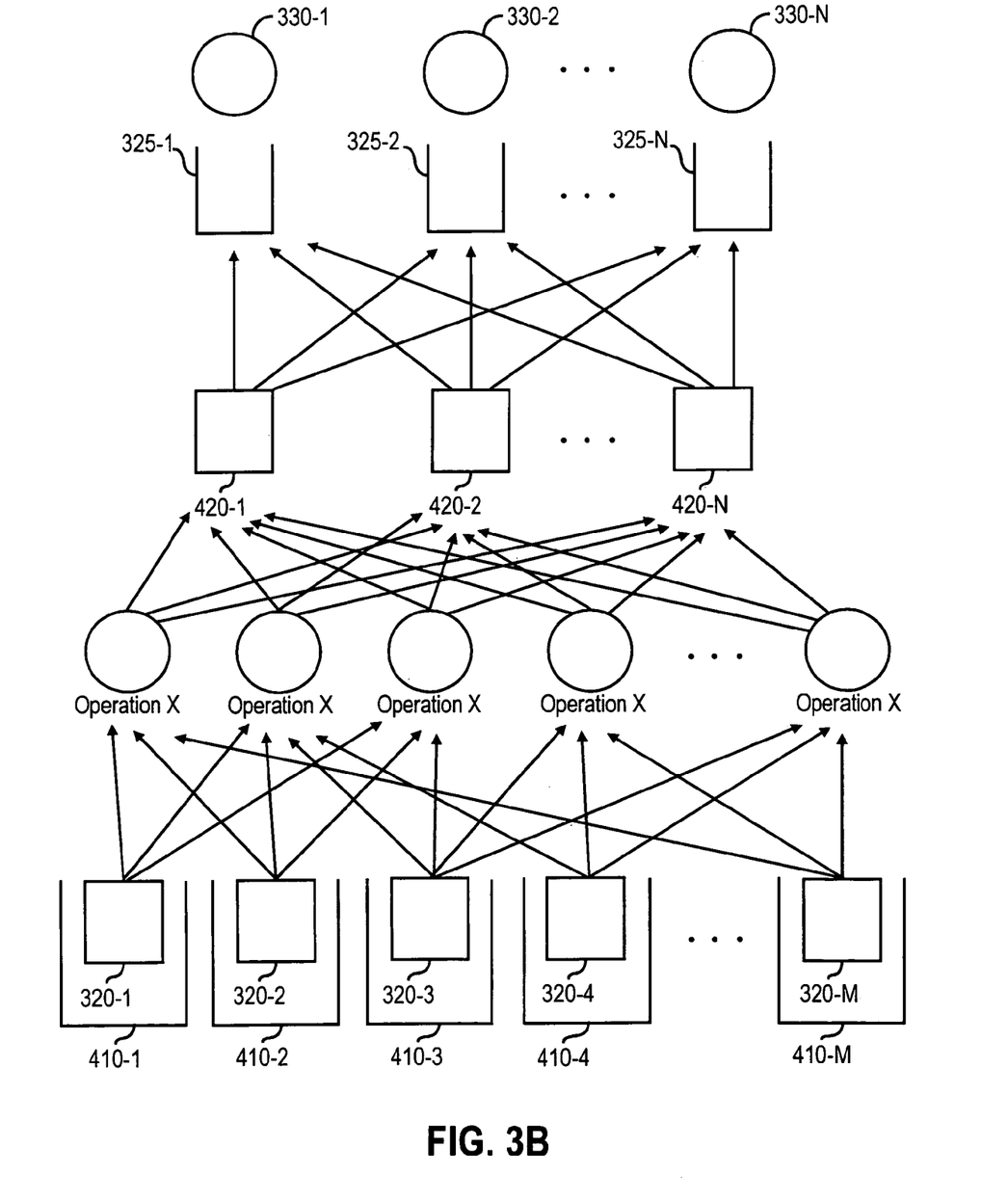
FIG. 3B shows an embodiment in which the data to be distributed to corresponding buckets is stored in memory buffers.

FIG. 3B shows an embodiment in which the set of data to be distributed is buffered in dynamic memory. In this embodiment, an original set of data that includes a plurality of subsets of data is stored in durable storage 410 as in FIG. 3A. Each subset of the data is then processed by one operation X or by a series of operations X. The data results produced by operations X are then stored in buffers 420-1 to 420-N and are to be distributed to buckets 325.

Similar to the embodiment with hard disks 410, each buffer 420 may have only one subset of data, or all subsets of data may be stored in one buffer 420. Again, the invention is not limited to the number of buffers 420 or the number of subsets that are stored in each buffer 420. Data stored in buffers 420 is then sampled and distributed to buckets 325 as described above.

In one embodiment, buffers 420 are used in combination with disks 410. If the set of data to be distributed is too large to be all stored in buffers 420, then some subsets of the data are stored in buffers 420, while some other subsets of the data are transferred to disks 310. The data stored in both disks 310 and buffers 420 are then sampled and distributed to buckets 325.

Embodiments of the invention may be used in the context of databases in which each data item in a bucket 325 is a row of a table that comprises a plurality of partitions 320. In such conditions, one table comprises a plurality of rows, and a set of rows constitutes a partition.

Specifying the Number of Samples

In one embodiment, the number of data items in each of the subsets of data to be sampled is specified as a percentage of the number of data items in the set of data. For example, if each partition of a table has 100 rows, then specifying 10% for sampled data items results in ten rows being randomly selected in each partition. Similarly, if an intermediate result set (or each partition thereof), has 100 rows, then specifying 10% for sampled data items results in ten rows being randomly selected from the intermediate result set (or each partition thereof).

In many systems, data is stored on disks in fixed-size storage units. Those fixed-size storage units, sometimes referred to as disk blocks, contain the durably stored data items. In an alternative embodiment, the number of data items to be sampled in each of the subsets of data is specified as a percentage of the total number of durable storage units used to store the set of data. For example, if each partition of a table has 50 data blocks, then specifying 10% for sampled data items results in the sampling of data items from 5 randomly selected data blocks in each partition.

Because the size of a data item may vary, the actual number of data items that fit within any given durable storage unit may vary. Consequently, the selection of 5 data blocks in each partition will not necessarily result in the same number of data items from each partition. Further, the selection of 10% of the durable storage units that store data in the set will not necessarily result in the selection of 10% of the data items.

In an embodiment that samples on a per-durable-storage-unit basis, less input-output (I/O) access is required to sample the same number of data items. For example, reading 5 randomly selected data blocks that store data from a table may result in a sampling of 30 rows, while reading 30 randomly selected rows from a table may require reading 30 data blocks.

In one embodiment, the user that submits a query for parallel operations has a choice to specify the number of data items (either in row or in block selection) to be sampled. The syntax of queries may be extended to allow these options to be specified on an per-query basis. The rule of how that data is to be sampled may be set as a default, giving the user the option of overriding the default by specifying the sampling parameters with the query. Once the user submits the query, the system operates accordingly, based on the default value if the user has not specified sampling parameters, or based on the user-specified sampling parameters the user has specified.

Hardware Overview

Figure 1:
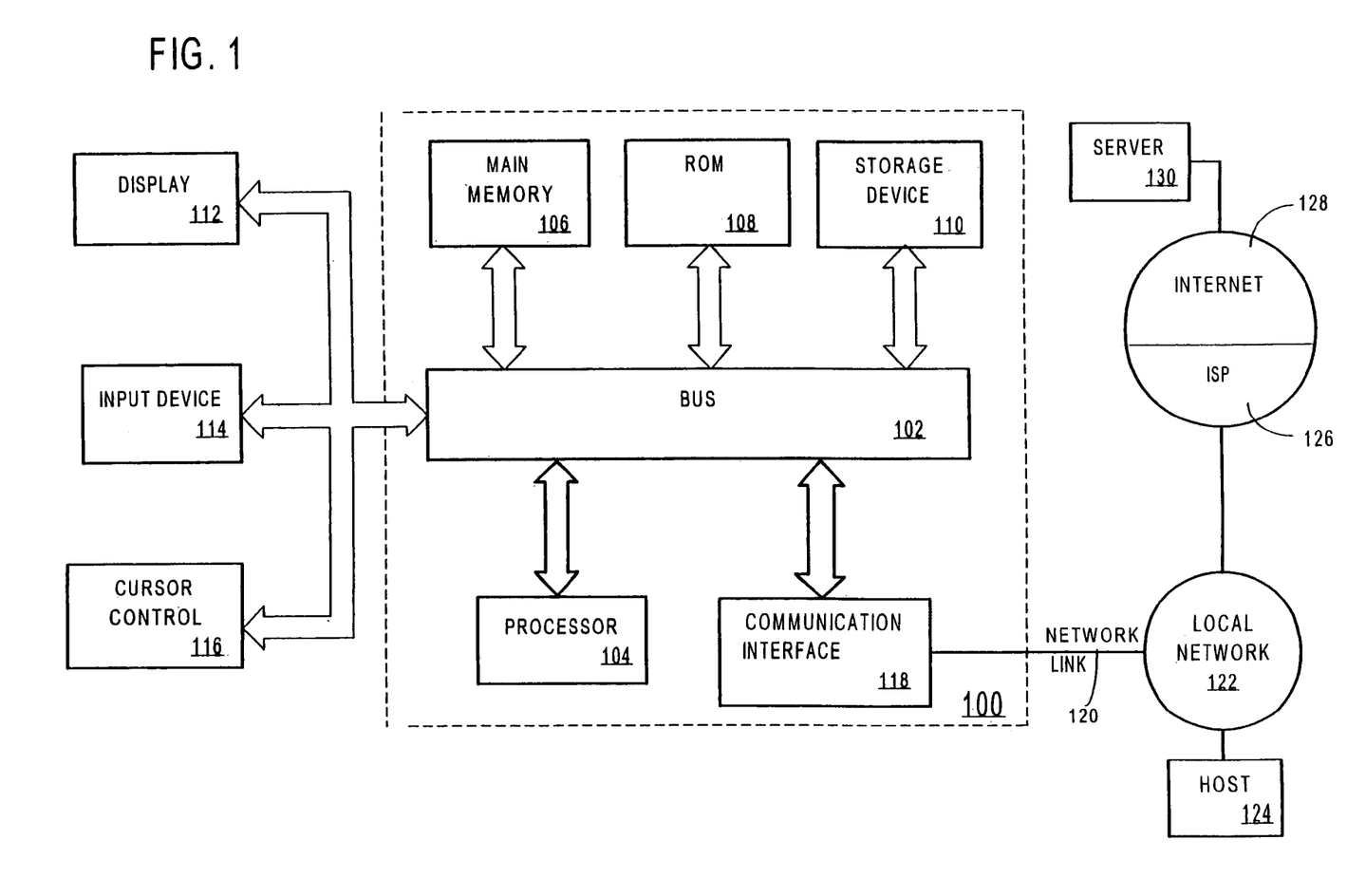
FIG. 1 shows a block of diagram of a computer system upon which embodiments of the invention may be implemented.

FIG. 1 is a block diagram that illustrates a computer system 100 upon which an embodiment of the invention may be implemented. In particular, computer system 100 may implement a computer configured to operate as described above. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are implemented by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application implements the techniques described herein.

The received code may be executed by processor 104 as it is received, and/or stored in storage device 110, or other non-volatile storage for later execution. In this manner, computer system 100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for distributing data items from a particular set of data into a plurality of buckets based on distribution key values associated with said data items, the method comprising the steps of:
   randomly selecting data items from said particular set of data to produce a sampled set of data items;
   determining a range for each bucket of said plurality of buckets based on a number of the distribution key values associated with said sampled set of data items that fall within said range;
   assigning said range to each bucket of said plurality of buckets; and
   distributing each data item in said particular set of data to the bucket that has been assigned the range into which falls the distribution key value of the data item.

2. The method of claim 1 further comprising the steps of:
   assigning the plurality of buckets to a plurality of processes; and
   causing each process of said plurality of processes to perform, in parallel with the other processes of said plurality of processes, an operation on the data items contained in any buckets assigned to the process.

3. The method of claim 2 wherein said operation is specified in a database command, the method further comprising receiving with said database command data that indicates how much of said particular set of data to randomly select to produce said sampled set of data items.

4. The method of claim 1 wherein the step of randomly selecting data items includes selecting a specified percentage of data items in said particular set of data.

5. The method of claim 4 further comprising the step of receiving, from a user, data that specifies said percentage.

6. The method of claim 1 wherein said ranges contain an approximately equal number of distribution key values associated with said sampled set of data items.

7. A computer-implemented method for distributing data items from a particular set of data into a plurality of buckets based on distribution key values associated with said data items, the method comprising the steps of:
   randomly selecting data items from each subset of a plurality of subsets of said particular set of data to produce a sampled set of data items;
   determining a plurality of ranges based on the distribution key values associated with the sampled set of data items;
   assigning said plurality of ranges to said plurality of buckets; and
   distributing each data item in said particular set of data to the bucket that has been assigned the range into which falls the distribution key value of the data item.

8. The method of claim 7 wherein the step of randomly selecting data items from each subset of a plurality of subsets of said particular set of data includes randomly selecting data items from each partition of a partitioned table.

9. The method of claim 7 wherein the step of randomly selecting data items from each subset of a plurality of subsets of said particular set of data includes randomly selecting data items from subsets of data, stored in buffers in volatile memory, that represent results of one or more previously performed operations.

10. The method of claim 7 further comprising the step of selecting a distinct random seed for each subset of the plurality of subsets of said particular set of data.

11. A computer-implemented method for distributing data items from a particular set of data into a plurality of buckets based on distribution key values associated with said data items, the method comprising the steps of:
    randomly selecting data items from said particular set of data to produce a sampled set of data items; wherein
        the particular set of data is durably stored on a plurality of durable storage units; and
        the step of randomly selecting data items includes randomly selecting durable storage units from said plurality of durable storage units and using the data items stored on said randomly selected durable storage units as the sampled set of data items;
    determining a plurality of ranges based on the distribution key values associated with the sampled set of data items;
    assigning said plurality of ranges to said plurality of buckets; and
    distributing each data item in said particular set of data to the bucket that has been assigned the range into which falls the distribution key value of the data item.

12. The method of claim 11 wherein the step of randomly selecting data items includes selecting a specified percentage of the plurality of durable storage units that are storing said particular set of data.

13. The method of claim 12 further comprising the step of receiving, from a user, data that specifies said percentage.

14. A computer-readable medium storing instructions that are executable by a computer, the instructions for distributing data items from a particular set of data into a plurality of buckets based on distribution key values associated with said data items, the instructions comprising instructions for performing the steps of:
    randomly selecting data items from said particular set of data to produce a sampled set of data items;
    determining a range for each bucket of said plurality of buckets based on a number of the distribution key values associated with said sampled set of data items that fall within said range;
    assigning said range to each bucket of said plurality of buckets; and
    distributing each data item in said particular set of data to the bucket that has been assigned the range into which falls the distribution key value of the data item.

15. The computer-readable medium of claim 14 further comprising instructions that are executable by a computer, the instructions for performing the steps of:
    assigning the plurality of buckets to a plurality of processes; and
    causing each process of said plurality of processes to perform, in parallel with the other processes of said plurality of processes, an operation on the data items contained in any buckets assigned to the process.

16. The computer-readable medium of claim 15 wherein said operation is specified in a database command, the computer-readable medium further comprising instructions for receiving with said database command data that indicates how much of said particular set of data to randomly select to produce said sampled set of data items.

17. The computer-readable medium of claim 14 wherein the step of randomly selecting data items includes selecting a specified percentage of data items in said particular set of data.

18. The computer-readable medium of claim 17 further comprising instructions for performing the step of receiving, from a user, data that specifies said percentage.

19. The computer-readable medium of claim 14 wherein said ranges contain an approximately equal number of distribution key values associated with said sampled set of data items.

20. A computer-readable medium storing instructions that are executable by a computer, the instructions for distributing data items from a particular set of data into a plurality of buckets based on distribution key values associated with said data items, the instructions comprising instructions for performing the steps of:
  randomly selecting data items from each subset of a plurality of subsets of said particular set of data to produce a sampled set of data items;
  determining a plurality of ranges based on the distribution key values associated with the sampled set of data items;
  assigning said plurality of ranges to said plurality of buckets; and
  distributing each data item in said particular set of data to the bucket that has been assigned the range into which falls the distribution key value of the data item.

21. The computer-readable medium of claim 20 wherein the step of randomly selecting data items from each subset of a plurality of subsets of said particular set of data includes randomly selecting data items from each partition of a partitioned table.

22. The computer-readable medium of claim 20 wherein the step of randomly selecting data items from each subset of a plurality of subsets of said particular set of data includes randomly selecting data items from subsets of data, stored in buffers in volatile memory, that represent results of one or more previously performed operations.

23. The computer-readable medium of claim 20 further comprising instructions for performing the step of selecting a distinct random seed for each subset of the plurality of subsets of said particular set of data.

24. A computer-readable medium storing instructions that are executable by a computer, the instructions for distributing data items from a particular set of data into a plurality of buckets based on distribution key values associated with said data items, the instructions comprising instructions for performing the steps of:
  randomly selecting data items from said particular set of data to produce a sampled set of data items; wherein
    the particular set of data is durably stored on a plurality of durable storage units; and
    the step of randomly selecting data items from said particular set of data to produce a sampled set of data items includes randomly selecting durable storage units from said plurality of durable storage units and using the data items stored on said randomly selected durable storage units as the sampled set of data items;
  determining a plurality of ranges based on the distribution key values associated with the sampled set of data items;
  assigning said plurality of ranges to said plurality of buckets; and
  distributing each data item in said particular set of data to the bucket that has been assigned the range into which falls the distribution key value of the data item.

25. The computer-readable medium of claim 24 wherein the step of randomly selecting data items includes selecting a specified percentage of the plurality of durable storage units that are storing said particular set of data.

26. The computer-readable medium of claim 25 further comprising instructions for performing the step of receiving, from a user, data that specifies said percentage.

* * * * *